United States Patent
Henshaw et al.

(10) Patent No.: US 7,213,085 B2
(45) Date of Patent: May 1, 2007

(54) USE OF A MEDIA CACHE FOR SUBSEQUENT COPYING ACCELERATION

(75) Inventors: Jeffrey D. Henshaw, Sammamish, WA (US); James E. Allard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/298,450

(22) Filed: Nov. 15, 2002

(65) Prior Publication Data

US 2004/0098533 A1 May 20, 2004

(51) Int. Cl.
*G06F 3/00* (2006.01)
*G06F 5/00* (2006.01)
(52) U.S. Cl. .......................................... 710/52; 710/56
(58) Field of Classification Search ................. 710/52, 710/56, 57; 711/118, 123, 126, 137; 707/1, 707/2, 100–102
See application file for complete search history.

(56) References Cited

U.S. PATENT DOCUMENTS

| | | | |
|---|---|---|---|
| 6,065,100 A * | 5/2000 | Schafer et al. ............... | 711/137 |
| 6,356,914 B1 * | 3/2002 | deCarmo et al. ......... | 707/104.1 |
| 6,415,359 B1 * | 7/2002 | Kimura et al. ............... | 711/137 |
| 2002/0045960 A1 * | 4/2002 | Phillips et al. ................. | 700/94 |
| 2002/0171567 A1 * | 11/2002 | Altare et al. ................... | 341/55 |
| 2004/0044849 A1 * | 3/2004 | Stence et al. ............... | 711/126 |

OTHER PUBLICATIONS

Copyright 2000, http://www.mp3-converter.com/mp3codec/frames.htm.*
Copyright 2000, http://www.mp3-converter.com/mp3codec/mp3_anatomy.htm.*
http://www.geek.com/glossary/glossary_search.cgi?r See the Definition for "Rip (v. to rip)".*

* cited by examiner

*Primary Examiner*—Donald Sparks
*Assistant Examiner*—David Martinez
(74) *Attorney, Agent, or Firm*—Workman Nydegger

(57) ABSTRACT

The apparent speed with which a media work is ripped to copy the work into a visible store is substantially reduced. When the media work is played, its content is cached onto a persistent, fast access storage media. If the user subsequently decides to rip the media work, the content of the cache is copied to a visible store in substantially less time than would be required to play the media work and convert it. The user thus perceives that the media work is ripped in a substantially shorter time, compared to that required for ripping the media work in a conventional manner. The ripping process may encode or transform the format of the content to a desired format for use within the visible store. Constraints may be imposed by the user to limit the cache, or the caching process may be hidden from the user.

21 Claims, 6 Drawing Sheets

USE OF A MEDIA CACHE FOR SUBSEQUENT COPYING ACCELERATION

FIELD OF THE INVENTION

The present invention generally pertain to creating copies of digital media, and more specifically, pertains to the use of a cache for temporarily storing media content when the digital media are played so that as necessary, the content is converted to a different format for storage in the cache and is thus subsequently available to be transferred to a visible store that is directly exposed to a user, substantially reducing the time required for adding the content to the visible store.

BACKGROUND OF THE INVENTION

The capability of creating copies of digital works distributed on compact disk-read only memory (CD-ROM) media, and more recently, on digital video (or versatile) disk (DVD) media, has resulted in a need to improve the efficiency and simplicity of the media copying and conversion process. Typically, users want to produce compressed copies of digital works from original recordings by converting the original format of the digital works into a desired format (typically more compressed than the original) for addition to a library of such works, i.e. to a "visible store." As used herein, a visible store is a collection of media that is exposed directly to a user, for example, via a media player, as a database listing of playable works, or through some other exposed mechanism. The tracks of interest to a user that are included on a commercial CD-ROM or other form of media storage are copied onto a hard drive or other form of non-volatile storage. Various types of media compression schemes, such as the moving pictures expert group (MPEG) audio layer 3 specification, which produces files designated by the ".mp3" extension, and Microsoft Corporation's WINDOWS™ media audio specification, which produces files designated by the ".wma" extension, can be employed for compressing the files that were stored on the digital media that is being copied. By compressing the data produced by copying tracks with one of these compression schemes, substantially more tracks of near original quality can be stored in non-volatile memory by a user, which is particularly important if the user wants to copy the compressed works onto a portable non-volatile memory medium, such as a CD-ROM, or into the memory of a portable music playing device.

A number of different software programs are available to copy digital media. For example, Microsoft Corporation's WINDOWS MEDIA PLAYER™, Musicmatch, Inc.'s MUSICMATCH JUKEBOX™, and Apple Corporation's iTUNES™ software programs include functions for copying and converting digital media content into various desired formats. The copying and conversion of digital media is not limited to music; it is becoming increasingly more common for movies and other works recorded on digital media to be copied and converted into more compressed formats.

However, the process of copying a work recorded on a commercial compact disk (CD), DVD, or other storage media can require substantial time, even with a relatively fast player. Typically, a user will play a digital media work at least once, and then will subsequently decide to rip it, which requires that the work again be "played" to copy it to the desired format, even if the work is played at a higher than normal listening rate, so that the digital content can be extracted, compressed if necessary, and then copied onto suitable digital media. Some digital media may actually require more time to process when "played" to enable producing a copy, since even at higher play rates, the processing required to put the content into a desired format may be relatively extensive and time consuming.

Improvements in both hardware and software-based techniques for copying a digital work have made the process easier and faster, but there is still a need to increase the speed of the process. Faster hardware players can increase the speed at which a digital work is read from the medium on which it was sold and distributed to the user, but there are limits to that process. Faster processing hardware can also reduce the time required to process the content that is extracted from a digital medium prior to recording the processed data for storage in another format. However, the copying process will be limited by the speed of existing hardware for most users, who may be unable to afford to purchase the very latest and fastest hardware devices for making digital copies. Accordingly, it would be desirable to provide a technique to increase the apparent speed of copying with a user's existing hardware player and processing devices.

In most cases, the greatest contributor to the time required for producing a copy is in reading the source digital medium to extract the content prior to converting the content to another format. Therefore, an approach is needed that apparently substantially reduces this time, without requiring that a user purchase faster playing or processing hardware.

SUMMARY OF THE INVENTION

In accord with the present invention, a substantial increase is provided in the speed with which digital data stored on a digital medium are copied so that the digital data are entered into a visible store in a form that is playable. In this method, a user plays the digital medium at a speed appropriate to experience the content provided by the digital data stored on the digital medium. While the digital medium are being played, the digital data are stored in a cache maintained in a non-volatile memory. The cache is accessible at a substantially higher data rate than the digital content stored on the digital medium. Subsequently, the user can selectively initiate entry of the digital data into the visible store on the non-volatile memory. In response, the digital data in the cache appear in the visible store substantially faster than if transferred from the digital medium in the conventional manner.

The digital data can be encoded or transformed into a format desired for use in the visible store. Or the digital data can simply be copied from the source into the cache. Typically, the digital data will be stored in the cache on a hard drive. In some applications of the invention, the visible store can be at the same location as the cache, once the user decides to copy the digital medium.

The method further includes the step of determining if the digital data are already stored in the cache when the digital medium source is subsequently again played at the speed appropriate to experience the content provided by the digital data. It is also contemplated that the digital data can be stored in the cache only after the digital medium source has been played a predefined number of times at the speed appropriate to experience the content provided by the digital data, to avoid caching the content of digital media that are only played a few times and not likely to be copied.

It may also be desirable to limit the digital data stored in the cache in regard to at least one of a lapse of a predefined time interval since the digital data were stored in the cache, a predefined limit on an amount of digital data stored in the cache, a predefined percentage of storage available in the non-volatile memory, and a predefined number of discrete works of digital data stored in the cache.

The digital data being stored in the cache may be padded and buffered as required. To keep track of the digital data that have been cached, a database entry is preferably associated with the digital data being stored in the cache. The database of such entries will also comprise a catalog of digital data works included in the visible store.

In one preferred form of the invention, the cache is hidden so that it is not apparent to the user until the digital data appear in the visible store. Also, the cache and visible store can comprise substantially the same portion of the non-volatile memory.

Another aspect of the present invention is directed to a memory medium storing machine instructions for implementing the steps of the method discussed above. Still another aspect of the present invention is directed to a system for increasing a speed with which digital data stored on a digital medium are copied so that the digital data are entered into a visible store in a form that is playable. The system includes a memory in which machine instructions are stored. At least a portion of the memory is non-volatile. The system includes a digital medium player that is coupled to at least one of an audio output device and a display. Also, a processor is coupled to the memory and the digital medium player, for executing the machine instructions stored in the memory. These machine instructions cause the processor to carry out a plurality of functions that are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

PC for Implementing the Present Invention

Figure 1:
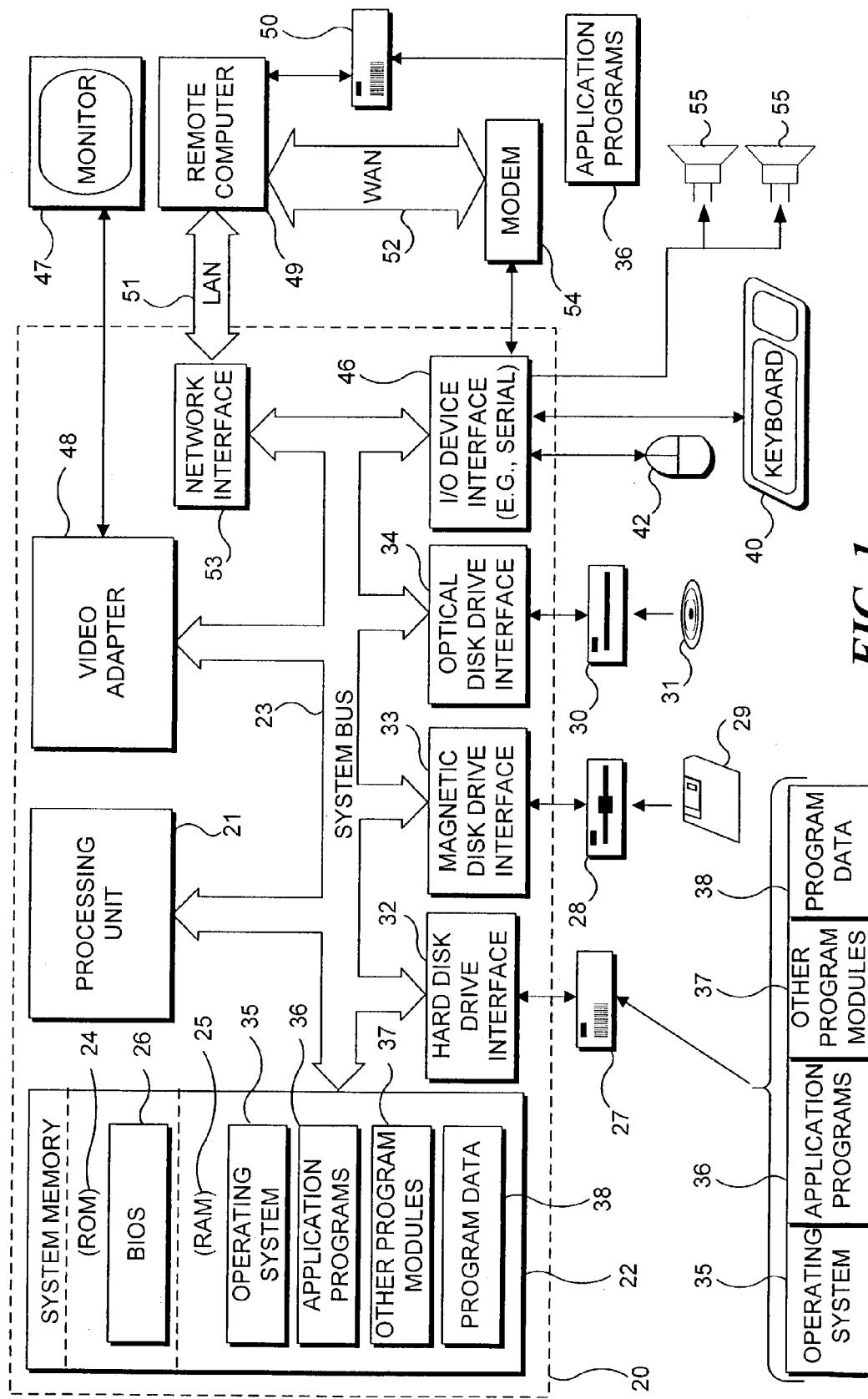
FIG. 1 is a functional block diagram of a conventional personal computer (PC) suitable for use in implementing the present invention.

With reference to FIG. 1, an exemplary general purpose computing device useful for implementing the present invention is illustrated in the form of a conventional PC 20. While the present invention was initially developed for use on a electronic game playing system, it will be understood that the invention is generally applicable to almost any type of computing device that might be used to play and copy digital media works (i.e., convert a digital media work stored on a digital medium from one format to another), including, for example, mobile computers, hand held computing devices such as personal data assistants (PDAs), mobile communication devices (e.g., cell phones), and other computing devices that include some mechanism for playing an audio and/or video media work on a digital medium and storing the work in a different format in non-volatile memory on the computing device.

An embodiment of the present invention is readily implemented on a general purpose computing device such as represented by PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disk 29, and an optical disk drive 30 for reading from or writing to a removable optical disk 31, such as a CD-ROM or other optical media, all of which comprise non-volatile memory media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disk 29, and removable optical disk 31, it will be appreciated by those skilled in the art that other types of computer readable media, which can store data that are accessible by a computer, such as magnetic cassettes, flash memory cards, DVDs, Bernoulli cartridges, RAMs, ROMs, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated environment, and/or other information, including visual content of a digital media work that is being played from its original distribution medium, such as a CD-ROM, DVD, or other storage medium. In addition to the monitor, PCs are often coupled to other peripheral output devices (not shown), such as speakers 55 (through a sound card or other audio interface (not shown)), and printers (also not shown).

As indicated above, the invention may be developed and practiced on a single computing device; however, PC 20 may operate in a networked environment using logical connections to one or more remote computers, such as a remote computer 49. Remote computer 49 may be another PC, a server (which is typically generally configured much like PC 20), a router, a network PC, a game console, a peer device, a satellite, or other common network node. Remote computer 49 may include many or all of the elements described above in connection with PC 20. So as not to make FIG. 1 unnecessarily complex, remote computer 49 is shown with only an external memory storage device 50. The logical connections depicted in FIG. 1 include a local area network (LAN) 51 and a wide area network (WAN) 52. Such networking environments are common in offices, enterprise wide computer networks, intranets, and the Internet. When coupled to the Internet, digital media works can be downloaded from a remote server and subsequently played and copied for storage on a selected non-volatile media (typically on a hard drive, but also on any other form of non-volatile storage) in a desired format that typically is more compact than the form of the digital media work when first played.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Electronic Gaming Console Environment

Figure 2:
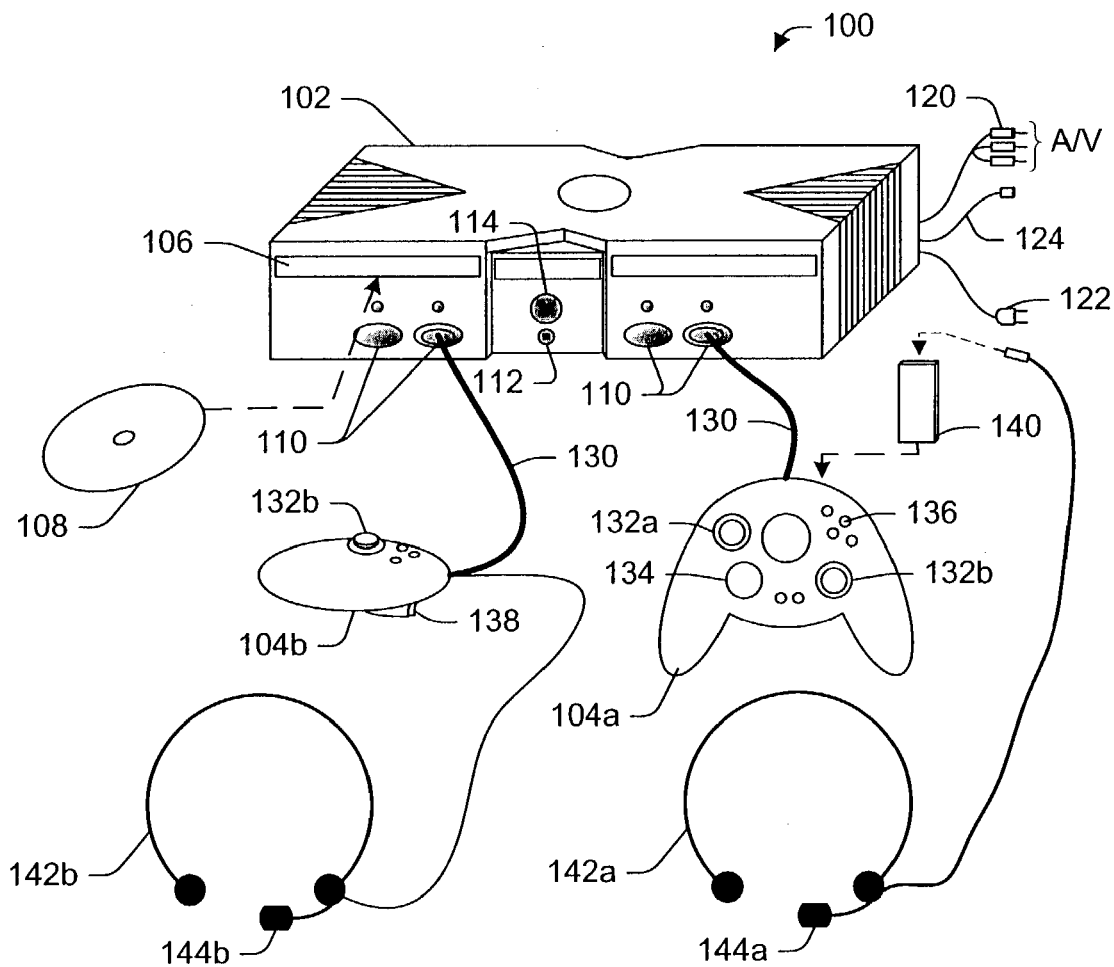
FIG. 2 is a schematic isometric view of an electronic gaming system suitable for implementing the present invention.

As shown in FIG. 2, an exemplary electronic gaming system 100 that is suitable for practicing the present invention includes a game console 102 and support for up to four user input devices, such as controllers 104*a* and 104*b*. Game console 102 is equipped with an internal hard disk drive (not shown in this Figure), which provides non-volatile storage, and a portable media drive 106 that supports various forms of portable optical storage media, as represented by an optical storage disk 108. Examples of suitable portable storage media include DVD disks and CD-ROM disks. In this gaming system, game programs are preferably distributed for use with the game console on DVD disks, but it is also contemplated that other storage media might instead be used on this or other types of systems that employ the present invention.

On a front face of game console 102 are four slots 110 for connection to supported controllers, although the number and arrangement of the slots may be modified. A power button 112 and an eject button 114 are also positioned on the front face of game console 102. Power button 112 controls application of electrical power to the game console, and eject button 114 alternately opens and closes a tray (not shown) of portable media drive 106 to enable insertion and extraction of storage disk 108, so that the digital data on it can be read for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 includes an Ethernet data connector 124 to transfer and receive data over a network (such as through a connection to a hub or a switch (not shown), or over the Internet, for example, through a connection to an xDSL interface, a cable modem, or other broadband interface (not shown). Other types of game consoles that implement the present invention may be coupled together or to a remote server, by communicating using a conventional telephone modem, but the ability to connect to another computer or game console is not particularly relevant to the present invention.

Each controller 104*a* and 104*b* is coupled to game console 102 via a lead (or alternatively through a wireless interface). In the illustrated implementation, the controllers are USB compatible and are connected to game console 102 via USB cables 130; however, it is contemplated that other types of data interfaces may instead be employed. Game console 102 may be equipped with any of a wide variety of user devices for interacting with and controlling the game software. As illustrated in FIG. 2, each controller 104*a* and 104*b* is equipped with two thumbsticks 132*a* and 132*b*, a D-pad 134, buttons 136, and two triggers 138. These controllers are merely representative, and other gaming input and control devices may be substituted for or added to those shown in FIG. 1 for use with game console 102.

A removable function unit 140 can optionally be inserted into each controller 104*a* and 104*b* to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142*a*, which includes a boom microphone 144*a*. The circuitry of the voice communication unit may alternatively be integrated into the controller and a headset 142*b* with boom microphone 144*b*, may be removably or permanently connected to the controller. Preferably, each controller is configured to accommodate two removable function units, although more or fewer than two removable function units or modules may instead be employed.

Gaming system 100 is capable of playing a variety of types of digital media works, including, for example, music and videos. It is contemplated that other functions can be implemented using digital data stored on the hard disk drive or read from optical storage disk 108 in drive 106, or using digital media works obtained from an online source, or from a MU. For example, gaming system 100 is potentially capable of playing:

Digital music stored on a CD in portable media drive 106, in a file on the hard disk drive (e.g., WINDOWS MEDIA AUDIO™ (WMA) format), or derived from online streaming sources on the Internet or other network; and Digital A/V data stored on a DVD disk in portable media drive 106, or in a file on the hard disk drive (e.g., after the media work has been copied and converted to an Active Streaming Format), or from online streaming sources on the Internet or other network.

Comparison of Required Time for Copying

Figure 3A:
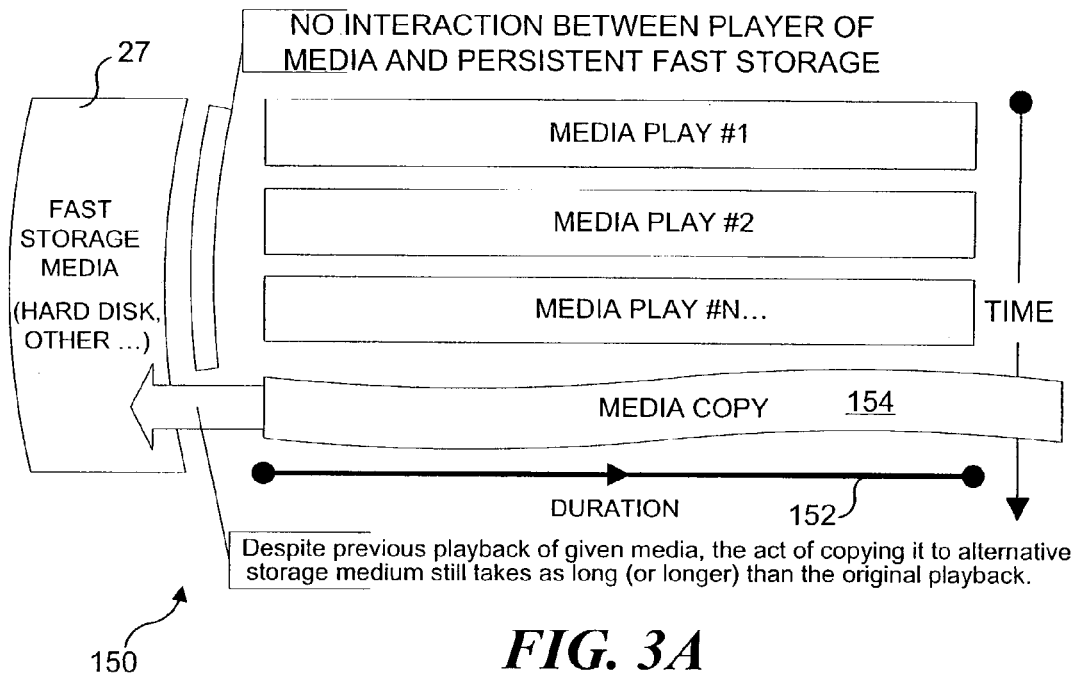
FIG. 3A (Prior Art) is a schematic diagram showing the relative time required to copy a digital media work using the conventional approach.

As noted above, the present invention addresses the perceived inefficiencies in the conventional approach used for copying digital media works, both music, video, and other forms of media presentations that are recorded in one format so that the work is converted to a different format desired for playback and further usage by the user. A schematic view 150 in FIG. 3 illustrates the conventional or prior art approach for copying such a media work. In the conventional approach, there is essentially no interaction between the player of the media and the persistent fast storage such as a hard disk 27 or other non-volatile storage medium. In the prior art approach, a user may have already played the digital media work from one to N times, before deciding that the media work should be copied and converted to a different format that will be stored on a hard disk or other persistent storage in a visible store. Once the user decides to copy the media content from its originally distributed form, a media copy 154 is made in the converted form. However, the time required to copy the work will likely be as long or longer than a duration 152, which is the time required to play the media work. Accordingly, the user must wait a relatively long time for media copy 154 to be produced by the conventional ripping approach, which is both frustrating and inefficient.

Figure 3B:
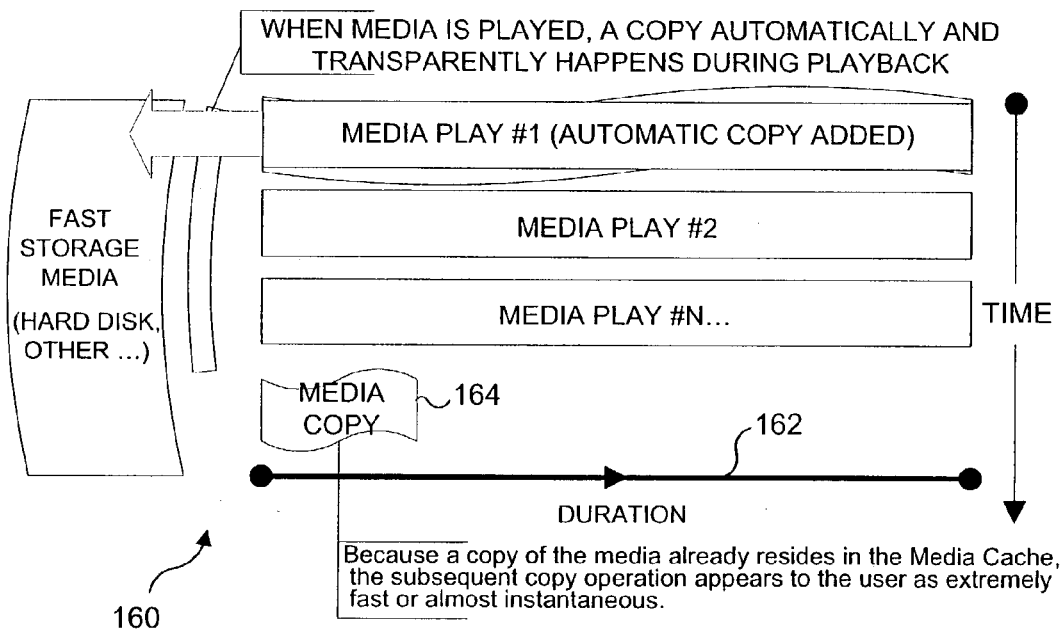
FIG. 3B is a schematic diagram showing the substantially shorter time required to copy a digital media work using the present invention.

A schematic diagram 160 in FIG. 3B illustrates the approach used in the present invention for ripping a media work. Typically, the first time that a media work is played, a copy of the digital media work is automatically cached in persistent fast storage media such as on a hard disk. The user is generally unaware that the cache of the work is being created and is able to experience the media work while the copy is automatically added to the persistent fast storage media. Subsequently, the user may decide to play the media work additional times before deciding to rip the media work to produce a copy. However, when the user decides to rip the media work, the apparent time required to form a media copy 164 is substantially less than a duration 162 that is required to play the media work, since the media content has been stored in the cache maintained on the persistent fast storage media.

Logical Steps for Implementing the Present Invention

Figure 4:
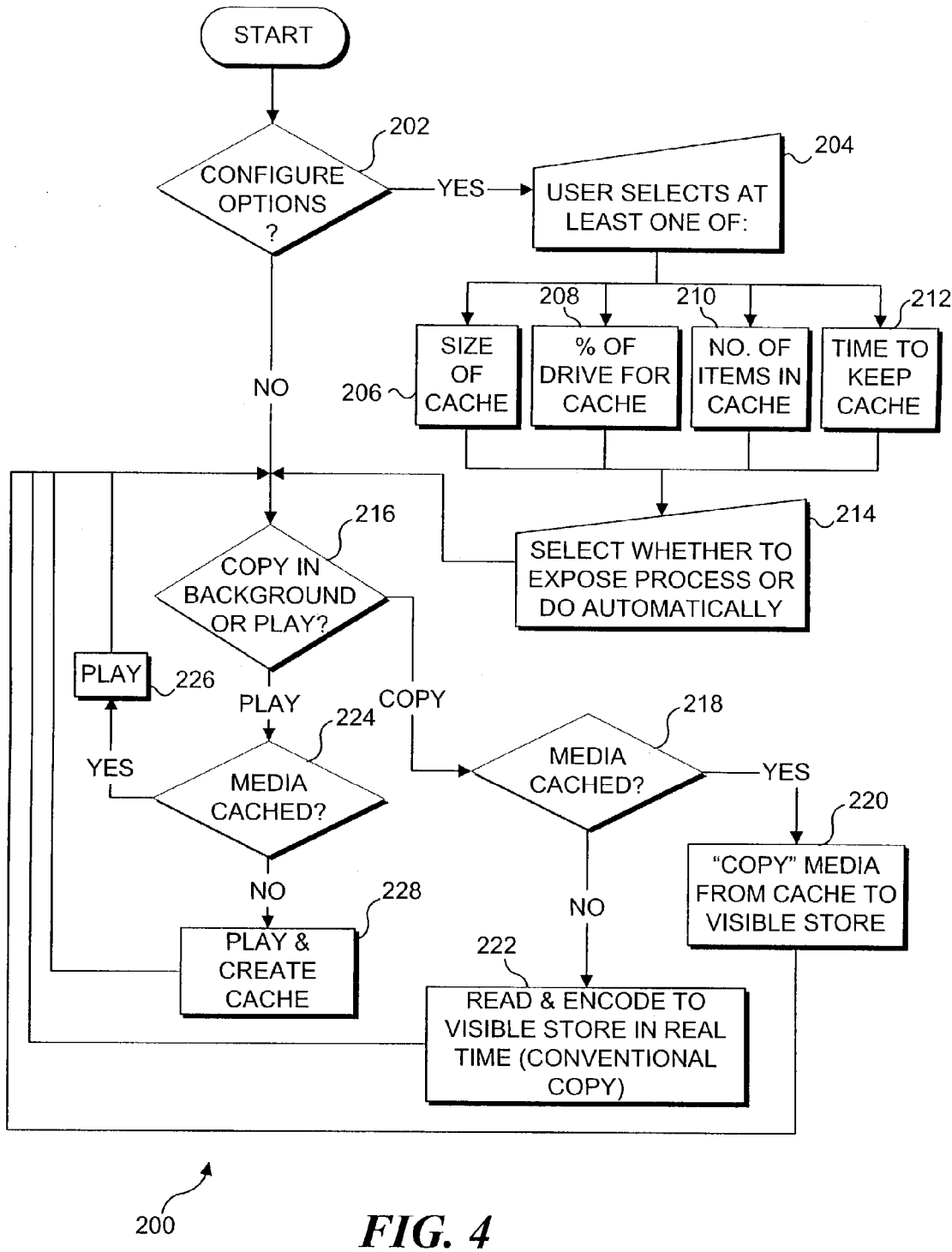
FIG. 4 is a flow chart showing the logical steps implemented when playing/copying a digital media work in accord with the present invention.

In FIG. 4, a flow chart 200 gives further details of the logical steps employed in a preferred embodiment for implementing the present invention. In certain applications of this invention, it may be preferable for the user to be unaware of the automatic caching of the content of media work that occurs when the user plays the work. However, in other applications of the invention, the user can be provided a user interface for controlling certain parameters of the cache used to store the content of the media work. For example, PC 20 will likely implement an interactive form of the invention in which the user will be allowed to select certain parameters for the cache, as described below in connection with FIG. 6. As implemented on electronic gaming system 100, the automatic caching of the media work will occur when it is initially played will be generally hidden from the user. Thus, a decision step 202 determines if the user is able to configure options that define certain parameters relating to the caching of the media work on the user's hard drive or other persistent non-volatile storage medium (or has already done so). If the user is to configure the options, a step 204 provides the user the opportunity to selectively set at least one of a plurality of different cache parameters 206, 208, 210, and 212. In a block 206, the user can define the size of the cache that is allocated for storing media works. Clearly, since the cache employs a portion of a hard drive or other persistent non-volatile storage media, the user may want to limit the amount of the persistent storage used for this purpose so as not to interfere with other uses of the persistent storage. Alternatively, the user can set a percentage of the hard drive or other persistent storage media that will be used for the caching of media works. As yet another option, the user can determine the number of items that will be maintained in the cache. In accord with this limitation, a first-in-first-out approach is adhered to, so that once the desired number of items in the cache has been achieved, the oldest item in the cache will be expired and overwritten or deleted to enable a newer media work content to be added to the cache. Finally, in a block 212, the user can define the time that an item will be retained within the cache. It will be apparent that if a user plays a media work one or more times, but does not elect to rip the media work into a different format within a predefined time limit, it is unlikely that the user will want to rip the work. Accordingly, once the time limit has been exceeded, a media work will be deleted from the cache, making room for storing the content of another media work in the cache.

After one or more of steps 206–212 have been selected by a user, a user can also determine whether to expose the process of creating a cache of a media work that is being played, or to carry it out automatically, in a step 214. Again, in initial preferred embodiments of the present application, the steps corresponding to an affirmative determination in decision step 202 will preferably only apply to the PC application of the invention and will not be employed in the electronic gaming system application.

Assuming that the user is given the opportunity to select the parameters for the cache as described above, or alternatively, after the parameters have been selected, a decision step 216 determines whether a media work that is currently being accessed by the user should be ripped in the background to create a "visible store" or played so that the user experiences the media work. If the user decides to rip the work in the background, a decision step 218 determines if the media content has already been cached. If so, the present invention "copies" the media work content from the cache to the visible store. Since the cache is maintained on a persistent fast access storage media, such as a hard disk, the copying operation carried out to rip the work requires a relatively short time compared to the actual time required to play the media work. However, if the media work has not yet been cached, a conventional ripping process is applied in a step 222. In this conventional process, the media work is read and encoded to create the form or format that will be used in the visible store. This conventional ripping process occurs in real time, as indicated in the prior art approach of FIG. 3A. After either step 220 or 222, the logic returns to decision step 216.

If the user decides to play the media work in decision step 216, a decision step 224 determines if the media work has already been cached. If so, the media work is simply played, as indicated in a step 226. However, if the media work has not yet been cached, as would be the case the first time the media work is played by the user, a step 228 plays the media work and also creates a cache of the content of the media work while the work is playing so that subsequently, if the user decides to rip the media work, step 220 can be carried out to copy the content of the media work from the cache to the visible store.

As used herein, the term "visible store" refers to a catalog of ripped media works that are available in a desired format, typically different than the original format of a media work, for use in playing the media work. For example, when a music compact disk (CD) is played, the content of the music CD can be converted into Microsoft Corporation's WINDOWS™ media audio file format. It is also contemplated that other forms of content can also be employed, such as Microsoft Corporation's WINDOWS™ media video file format. As a still further alternative, other types of compressed file formats may be desired, such as the MPEG Audio Layer 3 format. By creating the cache of the media content in the desired form while playing a media work, an entry of the work in the visible store in the format desired can quickly be achieved in response to a decision to rip the work, simply by copying the content that has been converted and stored in the cache over to the visible store of the user. Indeed, for use on the electronic gaming system, the cache maintained on the persistent fast access storage media or hard drive will be in the same location on the persistent storage media as the visible storage, but will not be visible to the user until the user affirmatively decides to rip the media work whose content is stored within the cache. Thus, in this case, the copying of the content simply converts the content from an invisible cached content to an entry in the visible store for use and access by the user.

Figure 5:
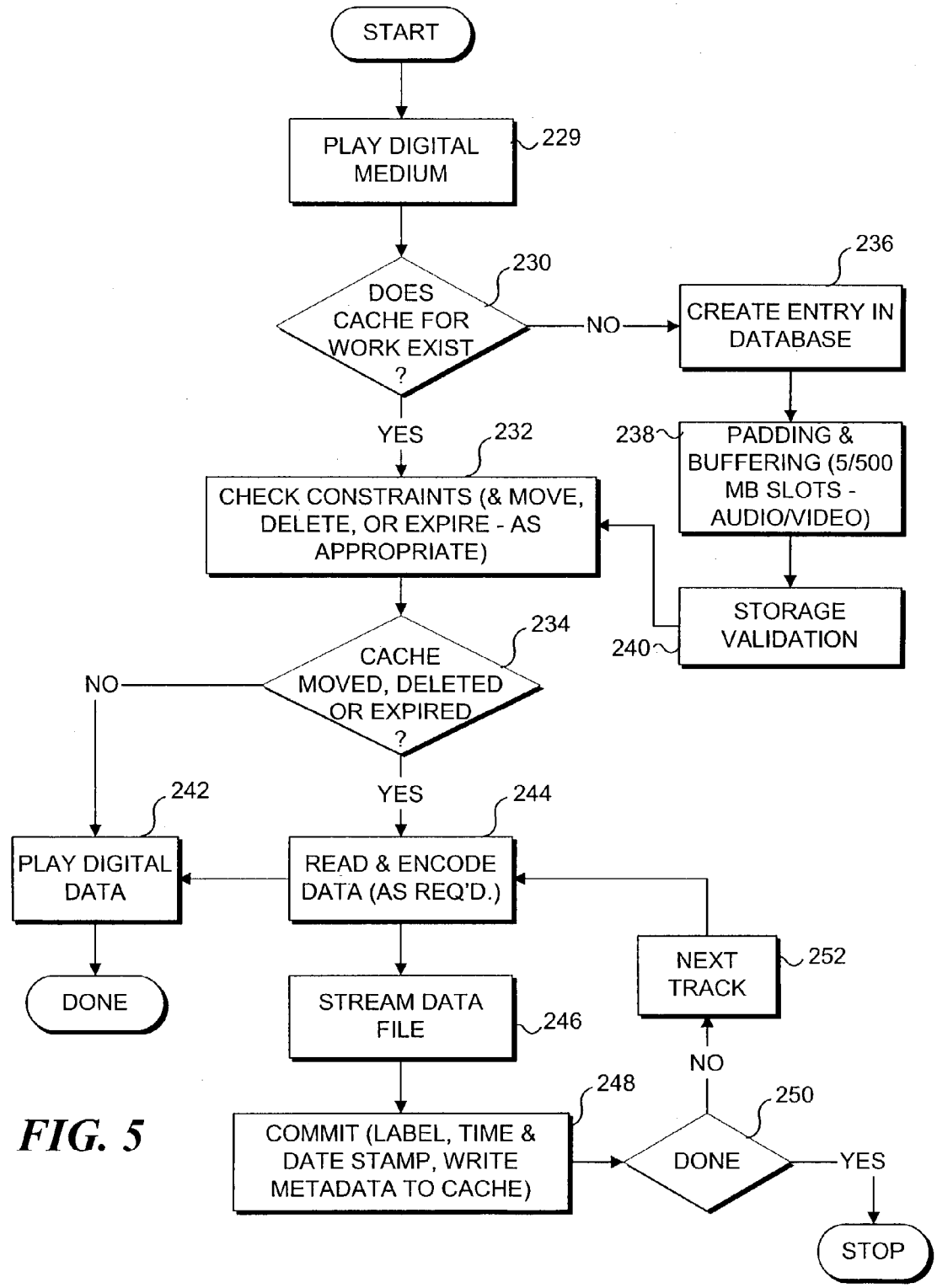
FIG. 5 is a flow chart illustrating details of the steps carried out by the present invention when a digital media work is played and its content cached.

In FIG. 5, further details of the steps implemented when playing and caching a digital media work are illustrated, beginning with a step 229 in which the digital media work is played. A decision step 230 then determines if a cache for the digital media work currently exists. If so, a step 232 checks the constraints (if any are permitted or have been entered by the user) relating to the size, duration of storage, and/or other parameters noted above for the cache. As required, a media work that is currently stored in cache may be moved, deleted, or simply indicated as expired, as appropriate based upon the constraints that are applied.

A negative response to decision step 230 leads to a step 236, which creates an entry in a database that tracks the media works that are maintained within the cache. A step 328 applies any padding and buffering required, depending upon the type of media work. For example, an audio media work may require five megabyte slots to be set aside for buffering, while a video media work may require 500 megabyte slots for this purpose. A step 240 validates that storage is available for caching the media work. Again, step 232 is repeated to determine if any constraints might prevent the media work from being cached, or to determine if previously cached media works need to be deleted or moved from the cache, in accordance with the constraints.

A decision step 234 determines if the media work that was previously cached has been moved, deleted, or expired. If not, the media work exists within the cache and has not been removed. Accordingly, a step 242 simply plays the digital data comprising the content of the media work, and the logical process is complete. However, if the media work that was cached has been moved, deleted, or expired, or alternatively if a new entry in the cache for the media work must be created, a step 244 reads and encodes the data comprising the content of the media work as required. It should be noted that step 244 can involve simply copying the content of the media work to the cache, if no conversion is required, but will more typically involve either encoding or transforming the content to another format. Also, it should be noted that the transforming can be from one compressed format to a different compressed format.

In a step 246, the data resulting from the process carried out in step 244 is streamed as a data file. A step 248 commits the streamed data file to the cache by providing header information, including a label, and a time and date stamp, and then writing the metadata for the content to the cache provided on the persistent fast storage media. A decision step 250 determines if all of the content or tracks comprising the media work have been processed, and if so, the logic is completed. If not, however, a step 252 advances to the digital data comprising the next track on the media work. Thereafter, step 244 and following steps are repeated in regard to the digital content of the next track.

An initial application of the present invention to the electronic gaming system of FIG. 2 is expected to enable a cache capable of holding the content of about 200 music CDs. However, since the cache and the visible storage occupy the same portion of the available space allocated for storing media works, ripping the works that are in the cache so that they now appear in visible storage does not increase the total number of disks that might be stored on the persistent, fast access storage media. On a PC having a relatively large persistent fast access storage media or hard drive, many more works of various types can be cached before the works are converted to visible storage. Also, the visible storage on PC 20 will likely be maintained on a different portion of the persistent, fast access storage media.

Figure 6:
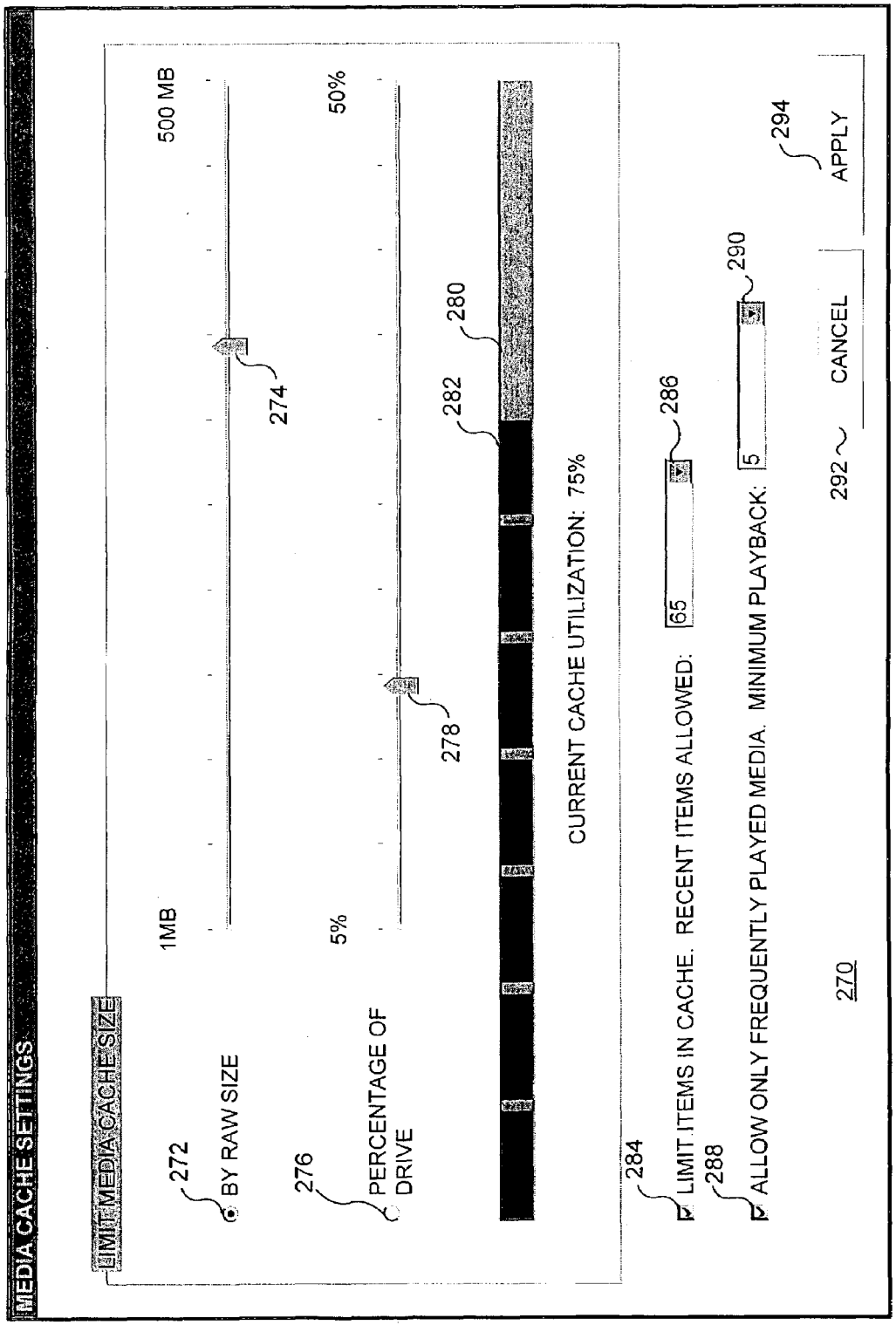
FIG. 6 is an exemplary user interface for use on a PC, to enable a user to configure options for the cache used in the present invention.

FIG. 6 illustrates a user interface 270 provided to enable a user to select the various parameters relating to the cache of media works. User interface 270 includes a radio button 272 that can be selected by the user to designate a raw size for the media cache. When radio button 272 is selected, a slider 274 can be set to designate the number of megabytes of storage allocated to the media cache. Alternatively, a radio button 276 can be selected, enabling a slider 278 to be moved to set a desired percentage of the persistent, fast access storage media or hard drive that is allocated to caching the content of media works. In this example, the range of available percentages is from 5 percent to 50 percent. However, different ranges for both the percentage of the drive and the allocated storage size can be provided, depending upon the type and the size of the storage media. An indicator bar 280 includes segments 282 to visually designate the current cache percentage utilization.

In addition, user interface 270 includes a check box 284, which if checked, limits the items in the cache so that only a designated number of items will be allowed in the cache, as entered within a dropdown text box 286. A check box 288 can be selected to indicate that the user only wants to permit frequently played media works to be cached. Accordingly, although a media work would typically be cached upon its first play, the user can select this option to indicate that a media work will only be cached after it has been played a minimum number of times, as entered within a dropdown text box 290. By selecting this option, the user would prevent the content of a media work from being added to the cache if the media work is played fewer than the number of times indicated in dropdown text box 290. A cancel button 292 and an apply button 294 are included to enable the user to either cancel the changes made in user interface 270 or to apply and close the interface.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A method for increasing a speed with which digital data stored on a digital medium are ripped so that the digital data are entered into a visible store in a form that is playable, comprising the steps of:
   (a) enabling a user to play the digital medium at a speed appropriate to experience the content provided by the digital data stored on the digital medium;
   (b) while thus playing the digital medium, storing the digital data in a cache maintained in a non-volatile memory, said cache being accessible at a higher data rate than the digital content stored on the digital medium;
   (c) hiding the cache and the digital data stored therein so that they are not apparent to the user and cannot be played by the user; and
   (d) at a subsequent time, copying the digital data that are stored in the cache into the visible store on the non-volatile memory if the user decides to rip the digital data and selectively initiates entry of the digital data into the visible store, said digital data in the cache appearing in the visible store faster than if transferred from the digital medium and being playable by the user after being transferred into the visible store.

2. The method of claim 1, further comprising the step of encoding the digital data into a format desired for use in the visible store.

3. The method of claim 1, wherein the step of storing the digital data in the cache comprises the step of storing the digital data on a hard drive.

4. The method of claim 1, further comprising the step of automatically determining if the digital data are already stored in the cache when the digital medium source is subsequently again played at the speed appropriate to experience the content provided by the digital data.

5. The method of claim 1, further comprising the step of storing the digital data in the cache only after the digital medium source has been played a predefined number of times at the speed appropriate to experience the content provided by the digital data.

6. The method of claim 1, further comprising the step of limiting the digital data stored in the cache in regard to at least one of:
   (a) a lapse of a predefined time interval since the digital data were stored in the cache;
   (b) a predefined limit for an amount of digital data stored in the cache;
   (c) a predefined percentage of storage available in the non-volatile memory;
   (d) a predefined number of discrete works of digital data stored in the cache; and
   (e) a number of times that the digital medium has been played.

7. The method of claim 1, further comprising the step of padding and buffering the digital data being stored in the cache.

8. The method of claim 1, further comprising the step of creating a database entry associated with the digital data being stored in the cache, said entry indicating the content of the cache.

9. The method of claim 8, wherein the database comprises a catalog of digital data works included in the visible store.

10. The method of claim 1, wherein the cache and visible store comprise the non-volatile memory.

11. A memory medium storing machine instructions for implementing the steps of claim 1.

12. A system for increasing a speed with which digital data stored on a digital medium are ripped so that the digital data are entered into a visible store in a form that is playable, comprising:
   (a) memory in which machine instructions are stored, said memory including a non-volatile portion;
   (b) a digital medium player coupled to at least one of an audio output device and a display; and
   (c) a processor coupled to the memory and the digital medium player, said processor executing the machine instructions stored in the memory, which cause the processor to carry out a plurality of functions, including:
      (i) enabling a user to play the digital medium with the digital medium player at a speed appropriate to experience the content provided by the digital data stored on the digital medium on said at least one of the audio output device and the display;
      (ii) while thus playing the digital medium, storing the digital data in a cache maintained in the non-volatile memory, said cache being accessible at a higher data rate than the digital content stored on the digital medium;
      (iii) hiding the cache and the digital data stored therein so that they are not apparent to the user; and
      (iv) at a subsequent time, copying the digital data that are stored in the cache into the visible store on the non-volatile memory if the user decides to rip the digital data and selectively initiates entry of the digital data into the visible store, said digital data in the cache appearing in the visible store faster than if transferred from the digital medium and being playable by the user after being transferred into the visible store.

13. The system of claim 12, wherein the machine instructions executing on the processor further cause it to encode the digital data into a format desired for use in the visible store.

14. The system of claim 12, wherein the non-volatile memory in which the cache is stored comprises a portion of a hard drive medium.

15. The system of claim 12, wherein the machine instructions executing on the processor further cause it to automatically determine if the digital data are already stored in the cache when the digital medium source is subsequently again played at the speed appropriate to experience the content provided by the digital data.

16. The system of claim 12, wherein the machine instructions executing on the processor further cause it to store the digital data in the cache only after the digital medium source has been played a predefined number of times at the speed appropriate to experience the content provided by the digital data.

17. The system of claim 12, wherein the machine instructions executing on the processor further cause it to limit the digital data stored in the cache in regard to at least one of:
   (a) a lapse of a predefined time interval since the digital data were stored in the cache;
   (b) a predefined limit for an amount of digital data stored in the cache;
   (c) a predefined percentage of storage available in the non-volatile memory;

(d) a predefined number of discrete works of digital data stored in the cache; and (e) a number of times that the digital medium has been played.

18. The system of claim 12, wherein the machine instructions executing on the processor further cause it to pad and buffer the digital data being stored in the cache.

19. The system of claim 12, wherein the machine instructions executing on the processor further cause it to create a database entry associated with the digital data being stored in the cache in a database included in the non-volatile memory, said entry indicating the content of the cache.

20. The system of claim 19, wherein the database comprises a catalog of digital data works included in the visible store.

21. The system of claim 13, wherein the cache and visible store comprise the non-volatile memory.

* * * * *